United States Patent [19]
Fink

[11] Patent Number: 5,428,999
[45] Date of Patent: Jul. 4, 1995

[54] METHOD AND APPARATUS FOR ACOUSTIC EXAMINATION USING TIME REVERSAL

[75] Inventor: Mathias Fink, Meudon, France

[73] Assignee: Universite Paris VII, Paris, France

[21] Appl. No.: 125,855

[22] Filed: Sep. 24, 1993

[30] Foreign Application Priority Data

Oct. 2, 1992 [FR] France ............................ 92 11659

[51] Int. Cl.[6] ............................................. G01N 29/00
[52] U.S. Cl. ............................. 73/599; 73/602; 73/599
[58] Field of Search ............... 73/599, 602, 606, 603, 73/598, 600, 596, 641, 628; 367/95, 124, 125; 364/507, 508

[56] References Cited

U.S. PATENT DOCUMENTS

| | | | |
|---|---|---|---|
| 4,456,982 | 6/1984 | Tournois | 73/624 |
| 4,463,608 | 8/1984 | Takeuchi et al. | 73/606 |
| 5,092,336 | 3/1992 | Fink | 128/660.03 |

FOREIGN PATENT DOCUMENTS 2074732 11/1981 United Kingdom .

OTHER PUBLICATIONS

IEEE Transactions on UFFC, vol. 39, No. 5, Sep. 1992, N.Y. U.S. pp. 555–566–M. Fink "Time reversal principles" Alinea III; Fig. 5 Alinea V; Fig. 8.
Journal of the Acoustical Society of America, vol. 90, No. 2, Aug. 1991, N.Y. U.S. pp. 1119–1129–C. Prada et al. "The iterative time reversal mirror: A solution to self-focussing in the pulse echo mode"–Alinea D–Alinea E.

*Primary Examiner*—Hezron E. Williams
*Assistant Examiner*—Helen C. Kwok
*Attorney, Agent, or Firm*—Larson and Taylor

[57] ABSTRACT

A method for acoustic examination of a medium and detection of reflective targets includes a preliminary step of injecting a divergent sound beam into the medium from at least one transducer. Then the echo signals reflected by the medium and received by several transducers in an array are picked up. A time gate is used to select echoes coming from a particular zone of the medium. The echoes are stored, time-reversed and re-emitted. The signals newly reflected by the medium are stored and the time-reversal operation is repeated. After a final time reversal of rank 2n+1 (where n is a positive non-zero integer) over the full depth of the measurement time gate, the characteristics of the wavefront passing closest to the maxima of the signals are determined, advantageously in the form of a time distribution of the maxima. The characteristics can often be approximated with a polynomial law. An apparatus is disclosed for implementing the method.

18 Claims, 11 Drawing Sheets

METHOD AND APPARATUS FOR ACOUSTIC EXAMINATION USING TIME REVERSAL

BACKGROUND OF THE INVENTION

The invention relates to a method and apparatus for acoustic examination of a medium to locate targets having acoustic impedance that is different from that of the surrounding medium. The term "acoustic" should be understood broadly, without being limited to frequencies that are audible.

The invention is applicable in numerous fields, and particular mention may be made of the following:

detecting and locating the defects such as faults, cracks, splits and non-uniformities of cristallographic structures, in a variety of materials such as metals, composites and ceramics, in objects of arbitrary shape, searching for solid objects in the sea or in sediments at the bottom of a body of water;

locating non-uniformities in the ground; and locating objects to be grasped by a robot.

A method of non-destructive acoustic examination of a medium is already known (EP-A-0 383 650) enabling reflecting targets to be located therein, in which, (a) a highly divergent sound beam is injected into the medium from at least one transducer, (b) the signals reflected by the medium and received by a plurality of transducers in an array are picked up;

(c) a time window or gate is used to select echoes coming from a particular zone of said medium, and the echoes are stored;

(d) the signals are time-reversed and they are re-emitted; and (e) the signals newly reflected by said medium are stored and the time-reversal operation is repeated.

A small number of interations suffices to bring out only those signals that are reflected by the largest reflector in the medium or by the most highly reflective point of an extended reflecting target, the signals being in the form of a set having a marked maximum on each of the receive paths corresponding to respective transducers in the array.

In particular implementations of the method defined above, the time distribution of the signal maxima is stored for subsequent use. In another implementation, the spread of the signals in time is determined by cross-correlation between pairs of signals. Nevertheless, that requires a large amount of calculations. No immediately understandable indication is directly obtained concerning the location of the target (or targets) presence in the medium from either method.

SUMMARY OF THE INVENTION

It is an object of the present invention to provide a method suitable for detecting reflecting targets, locating them, ultrasound echographic imaging, and optionally concentrating acoustic energy on a target, satisfying practical requirements better than previously-known methods.

It is a more specific (but not exclusive) object of the invention to solve various problems relating to the time reversal technique as defined above. Until now, time reversal has been considered only for giving rise to automatic focussing thus obtaining optimum focussing of transmitted energy in the presence of a target. In other words, the method has been used to create a maximum acoustic pressure at the location of the target. However, in many applications, it remains necessary (or at least desirable) to locate the target three dimensionally once it has been found that a target is present. In particular, it is often desirable to characterize a previously detected target by forming an echographic type image thereof This requires automatic focussing on reception.

In addition, although the method defined above gives favorable results, it nevertheless suffers from a limitation when it is desired to increase the number of iterations: the echographic signals become longer and longer as more time-reversed sequences are repeated, and this gives rise to loss of axial resolution that can be detrimental to image quality in certain circumstances.

The invention is based on the finding that when a reflecting target is present in the zone selected by choosing a time window, an odd number of time reversals gives rise, in each path, to an echographic signal that is time symmetrical, having a maximum that corresponds best to the location of the wavefront due to reflection on the target, or, in other words, to the surface of said acoustic wavefront.

Consequently, possibly after verifying that a wavefront is present and after a final time reversal of order or rank $2n+1$ (where n is a positive non-zero integer) over the full depth of the measurement time window, the characteristics of the wavefront passing closest to the maxima of said signals are determined, advantageously in the form of a time distribution of the maxima, which characteristics can often be approximated with a polynomial law.

The time delays for each transducer for reconstructing the wavefront on transmission can be deduced therefrom. It is also possible to sum the signals after time-shifting them by time delays to locate the target.

In an advantageous implementation, digital memories are attributed to each path or channel on reception, i.e. to each transducer used for reception purposes and the arrival instants of signal maxima at each transducer are determined by scanning through the contents at successive addresses in the memories attributed to the samples of the echo signals.

The time-delay relationship may be used for re-emitting a new illuminating wavefront by transmitting signals all having the same shape and a very short duration via all of the paths at respective instants that are defined for each transducer by the complement of the relationship for the distribution of the maxima, with the earliest maxima corresponding to the signals that are emitted last.

Once a target has been located, this makes it possible, in particular, to synthesize an intense ultrasound beam converging on the most highly-reflecting point of the target, particularly when it is desired to destroy said target. The time-delay relationship that is obtained may also be used for summing together reception signals after they have been time-shifted for achieving coincidence by applying the appropriate delay over the entire duration of the time window. It is thus possible to synthesize the optimum wave surface and subsequently to perform transmission and/or reception focussing.

Search for a possible reflecting target

As mentioned above, in general, the relative positions of the maxima should be determined and the emission and/or reception signals should be time shifted only if the presence of a wavefront coming from a target has initially indeed been observed in the time window in which measurements and then time reversals are performed. In general, time reversal is selected to correspond to portions of the medium under examination that are of interest.

The window may be known a priori, e.g. when a target has previously been located by echographic or X-ray means. The window may also be determined by a rough evaluation of the time of flight corresponding to the selected target. The position and the size of the time window are selected so that signals due to reflection or to diffraction on the target are certain to be included in the window. It is also possible, e.g. when searching for defects in a material of considerable thickness, to subdivide the depth under examination into a plurality of windows and to check whether large echoes exist within each window after performing a plurality of time reversal iterations. To do this, after each iteration, it is possible to sum incoherently the signals received via each path over the entire duration of the signals in the window and to verify whether the resulting signal has a local maximum in the window. The procedure of searching for maxima in each path is then subordinate to obtaining a favorable result from a comparison between the resulting echo signal and a predetermined threshold.

Still another procedure consists in comparing the signals received in the window for two successive iterations. This procedure is particular advantageous when searching for the presence of defects within a diffusing medium formed by small non-uniformities that are distributed densely and randomly. Titanium alloys, composite materials, and granular steels constitute examples of such media. If the signals picked up by the transducers of the array come from a reflective target, their space structures will remain practically unchanged from one shot to the next. In contrast, if the signals picked up during two successive shots are not correlated, then they come from diffusers that are so intimately mixed in the medium to be mutually separated by the time reversal operation.

A measure of the degree of correlation or of the degree of similarity between echo signals resulting from two successive iterations can be obtained by summing the cross-correlation coefficients of two consecutive shots for each of the transducers. If the signal received in the time window by transducer of order k during iteration R is written $E_k{}^p(t)$, and the signal received during iteration p+1 is written $E_k{}^{p+1}(t)$, then the total correlation function $c(\tau)$ between the two shots can be written:

$$c(\tau) = \frac{\sum_k \int_o^T E_k{}^p(t) \cdot E_k{}^{p+1}(t-\tau)dt}{\left\{ \sum_k \left[ \int_o^T (E_k{}^p(t))^2 dt \cdot \int_o^T (E_k{}^{p+1}(t))^2 \cdot dt \right] \right\}^{\frac{1}{2}}}$$

where T is the width of the time window.

The correlation coefficient is equal to the value of the maximum $c(\tau)$. When this maximum is close to 1, it can be concluded that the window contains a reflecting target. When it is below a determined threshold selected as a function of experimental conditions and equal to 0.5, for example, then it can be deduced that the medium under observation is a diffusing medium that does not contain any preponderant target.

When the transducers are separated from the medium by an interface, then the time windows (which may be the same or different during successive shots) should be selected to eliminate echoes from the interface per se and also from a rear interface, if any.

Locating and imaging

The above operations may be considered as intended to discover whether any target is present. It then remains to locate the target, and possibly to form an image thereof.

When it is desired to characterize the target by providing an image thereof, an echographic method may be implemented that provides an image of the zone surrounding the target that generates the located wavefront, by determining the relative time positions of the maxima in the wavefront. Various methods can be used to do this.

In particular, an image can be formed of the first line of the echographic image, (the line which is centered on the target) by generating an illuminating wavefront that corresponds to an excitation of very short duration, e.g. about $\frac{1}{2}$ of the acoustic period, by energizing the transducers in a time succession that is complementary to the delays: a transducer that received the signal at an instant $\tau$ will be energized at an instant $T_0-\tau$, where $T_0$ is a constant value. Thereafter, all of the reception signals are summed together after being shifted by applying the time delays.

Another approach consists in performing a sector scan around the first line of the image. To do this, the previously-established delay relationship is modified by summing it with another delay relationship corresponding to deflecting the ultrasound beam through a small angle $\Theta$, using the "phase array" technique. Then, by using the new delay relationship on transmission and on reception, and by summing the newly received signals, an echographic image is obtained that is focussed in a direction that makes an angle $\Theta$ relative to the target axis (line directed to the center of the target).

By applying delays that correspond to different angles, an image is obtained by sector scanning.

In yet another modification, instead of transmitting identical short pulses via each path, the signals that are emitted are each the time reversal of a signal received on the preceding iteration and occupying a time period that is relatively short (a few periods) centered on the maxima.

Lateral focussing is then better than that obtained by emitting a simple wave surface, but axial resolution is reduced.

This modification is particularly useful when it is necessary to refocus through media that are highly non-uniform since it improves lateral refocussing. This is a result of the fact that optimum refocussing at a point is obtained by re-emitting a "wave volume" instead of a wave surface.

For the same reason, it may be advantageous to improve focussing on reception, particularly in non-uniform media, by performing a convolution product of the echographic signals and the time-reversed transmitted signals. Replacing a simple time shifting operation by this approach makes it impossible to use simple delay lines and requires convolution software or hardware, but it provides an echographic signal that is more intense for a given amount of energy emitted by the set of transducers since convolution products are summed over all of the paths. Nevertheless, the amount of computation required is justified only for media that are highly non-uniform.

Here again, it is possible to angularly move the focussing lines by time shifting the emission and/or reception signals with an appropriate delay relation. Such shifting may be performed, in particular, when digital convolution means are used by performing a time shift obtained by changing the address read-out from the memory containing the signals to be emitted, prior to performing the convolution.

As mentioned above, complex computations are generally not necessary with media that are only slightly non-uniform. Under such circumstances, it suffices to focus and synthesize a wave surface from the positions of the maxima.

Indeed, it is then often possible to assume that the wavefront is a geometrical surface that is simple in shape by means of a mathematical optimization method based on a determined criterion, e.g. least squares method.

The problem is further simplified when the medium is practically uniform, since the wavefront coming from a point can then be assumed to be a spherical surface.

It is then possible to assume that maxima are distributed in accordance with a law that corresponds to a sphere that constitutes the best fit or match with the wave front (according to a criterion such as the least squares of errors or deviations).

The validity of the approximation can be evaluated by determining the error variance. If it is small enough, experimental error can be corrected thereby.

This is particularly desirable when, during a final step, a time shift distribution is reproduced that corresponds to a wavefront which is assumed to be a sphere for the purpose of concentrating ultrasound energy on the most highly reflecting target.

In most cases, it is also possible to deduce by calculation the characteristics of the sphere from data provided by a small number of the transducers in an array and to deduce therefrom the delays that should be applied to each of the transducers in the array on emission for the purpose of focussing energy on a target that may be offset laterally relative to the axis of the array. With a uniform medium, it is thus possible to implement the invention while implementing time reversal means to the measurement channels of a few transducers only.

The invention will be better understood from reading the following description of a particular embodiment given by way of non-limiting example. The description refers to the accompanying drawings.

DETAILED DESCRIPTION

The invention can be implemented with an apparatus of the general kind described in document EP-A-O-383650 or U.S. Pat. No. 5,092,336 to which reference may be had. Consequently, the apparatus is described only briefly herein.

Figure 1:
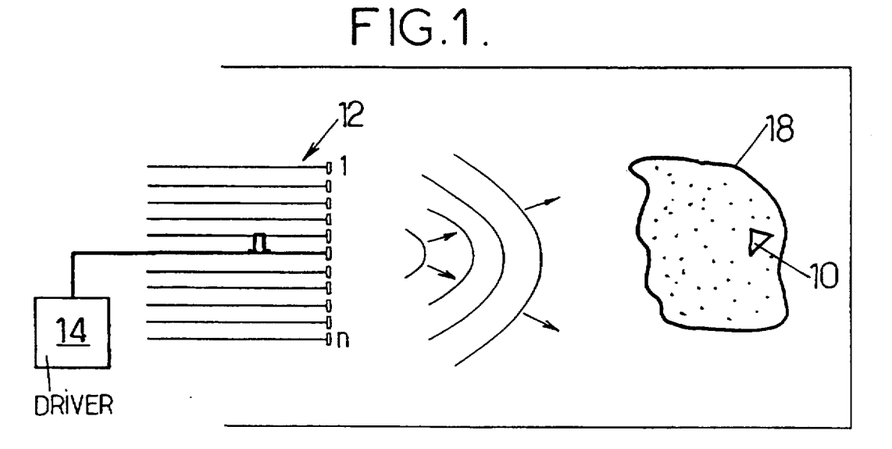
FIGS. 1, 2 and 3 are theoretical diagrams showing three successive stages in implementing a method of the invention and including timing diagrams showing the shape of the electrical signals as applied to at least one transducer during a first shot (FIG. 1); as obtained from first shot (FIG. 2); and as applied to the transducers after time reversal (FIG. 3)
Figure 2:
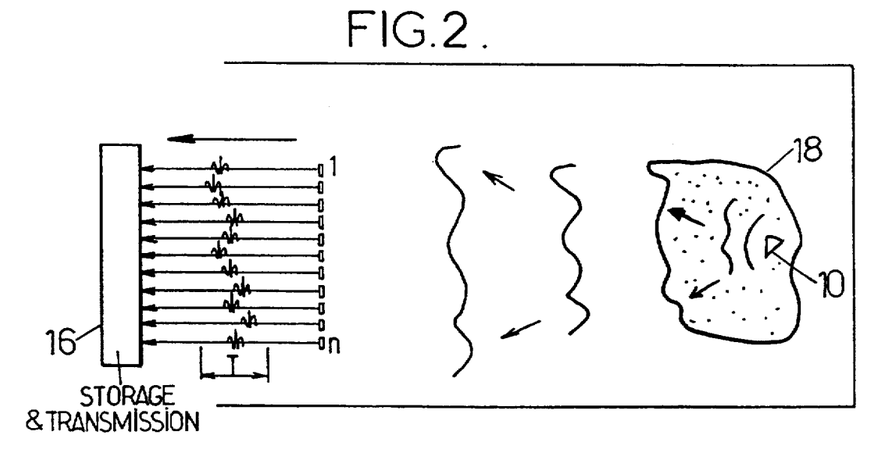
Figure 3:
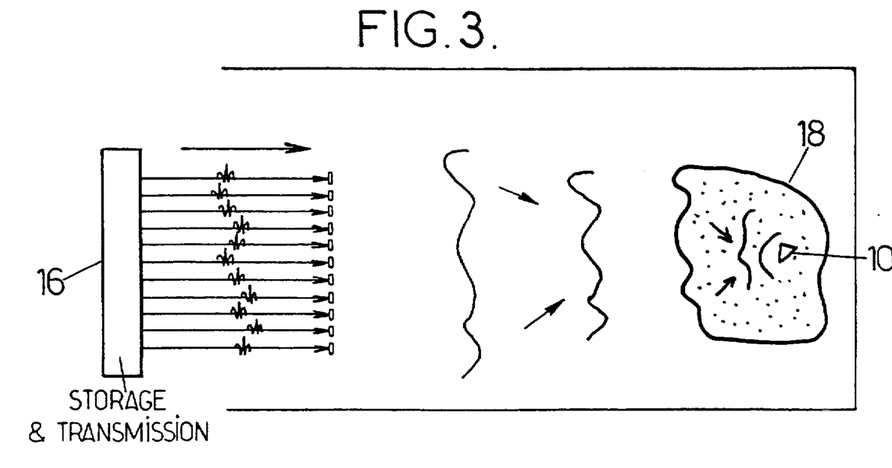

Referring to FIGS. 1 to 3, the method of the invention gives rise progressively to the formation of an acoustic pressure field that converges on a main target 10 located in a medium 18.

Figure 5:
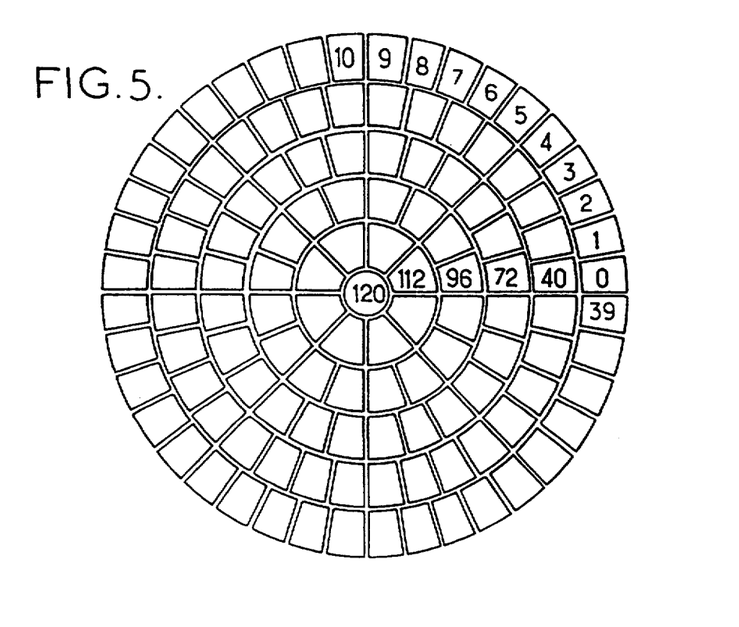
FIG. 5 shows one possible matrix distribution of transducers in an apparatus for implementing the invention.

During a first step (a), a zone containing a target 10 to be located is illuminated with a wide and non-focussed beam (FIG. 1). As shown in FIG. 1, this beam is provided by the central transducer of a matrix 12 of ultrasound transducers 1, 2, ..., i ..., n (e.g. with n=64) that is used during the following steps. The transducers are often distributed in a two-dimensional matrix, although the transducers are shown as occupying a single line. The matrix may be plane or concave. It may comprise a rectangular array. The transducers may also be distributed in concentric circles, as shown in FIG. 5, or even in an array having nodal locations devoid of transducers. It is equally possible to use some transducers in the matrix, or even all of them, for the first illumination. In the example shown in FIG. 1, the central transducer is energized during the first illumination by a circuit 14.

A nonfocussed beam is thus obtained that illuminates the target 10 situated inside a medium 18.

The circuit 14 may be a short pulse generator feeding one or more transducers.

During a step (b), the echo signal received by the transducers of matrix 12 are picked up and the waveforms and relative positions in time t of the signals are stored by means of a circuit 16 (FIG. 2). For example, the first echo signals may have the waveforms shown in FIG. 2 in response to an excitation electrical signal in step (a) constituted by a short pulse.

By examining the received signals, e.g. on an oscilloscope or a TV monitor, it is possible to select a time window of duration T that contains substantially all of the reflected energy as picked up by the transducers of the matrix 12. The circuit 16 stores only the signals contained in the time window.

During a step (c), the signals picked up during time window T are time reversed for a first time and they are transmitted (FIG. 3) with an amplification gain that may be the same for all transducers. The gain is adjusted automatically to satisfy one condition: none of the channels or paths each associated with a transducer is to be saturated on reception.

The wavefront constituted in this way is automatically made symmetrical and the echo received in return by the transducers of the matrix 12 appears at the output from each of said transducers in the form of a signal that is symmetrical about a central maximum value. If the process of time reversing and storing the echoes is repeated several times, symmetrical signals will be picked up during each odd numbered step on each of the detection paths associated with a respective transducer, and simultaneously energy will progressively be concentrated on the largest target, if the medium contains a plurality of target, or on the most highly reflective portion of a single target.

Figures 3A, 4:
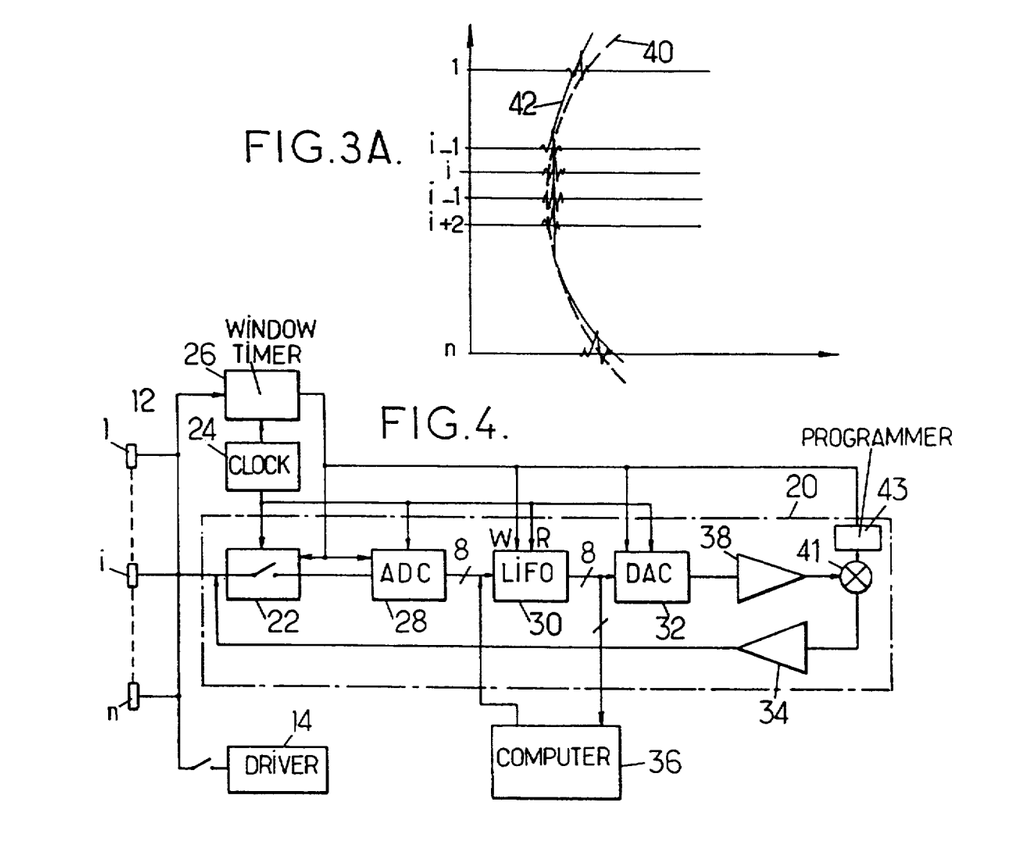
FIG. 3A shows a possible synthesis of a spherical wavefront.
FIG. 4 is a block diagram of a measurement path associated with a particular transducer in an apparatus constituting a particular embodiment of the invention.

It is then possible, from the signals picked up during the last odd-numbered iteration, to determine a simple geometrical line or surface 40 (e.g. a sphere) that is closest to the wavefront 42 defined as being the surface containing the maxima of the various signals.

An advantage of approximating the wavefront by means of a curve or surface that is geometrically simple is to make it easy to determine the center or focus of the surface and to identify the exact position of the most highly reflecting zone on the target. This makes it possible to end of the method with a final step that is adapted to the intended application.

When the final operation consists in destruction, that may be done by greatly amplifying the signal applied to each transducer and by time shifting each of the signals by applying a delay corresponding to focussing on the center of the surface 40.

In this case, the probability that the center of the sphere corresponds to the location of a zone of the target to be destroyed must be close to 100%. To achieve such near-certitude, it is generally necessary to perform a verification step: this may consist in determining the variance of the differences or errors between the surface 40 and the positions of the maxima. The surface 40 is then considered as being unacceptable as a representation of the wavefront when the variance exceed a predetermined value.

Figure 9:
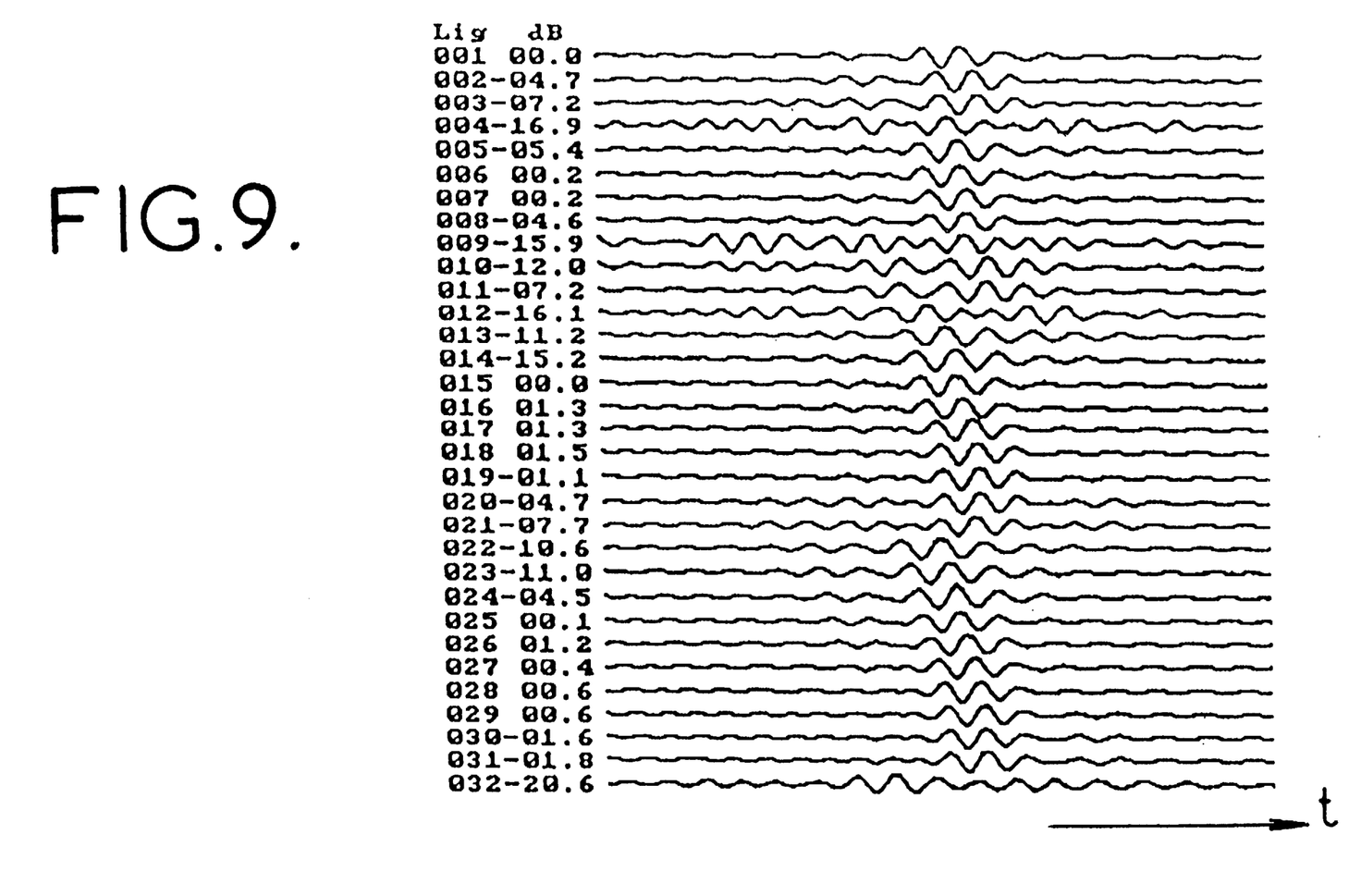
Figure 10:
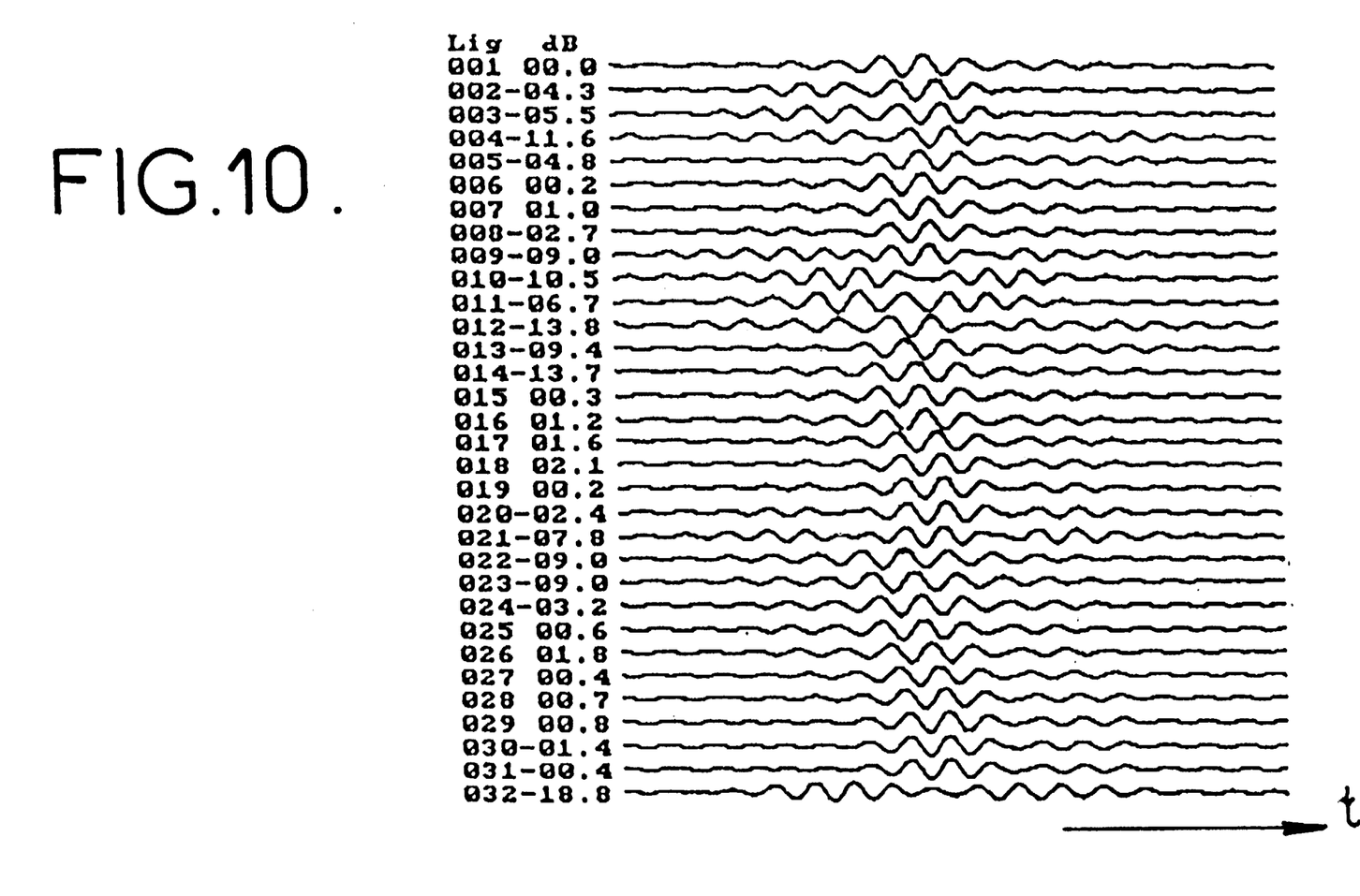
FIG. 10 is similar to FIG. 9 and shows the echo signals after five time reversals each with time windowing.

Other applications make it desirable to evaluate the size of the target. To do this, it is possible, in particular, to store the delays corresponding to the wavefront centered on the most reflecting zone of the target 10 and then to make shots with delays that are modified in compliance with a law of the type used for sector scan with phase array to focus on points that are offset laterally. For each distribution of delays on emission, it is also possible to perform focussing on reception by shifting all of the reception signals in compliance with the reversed emission delay relationship and by summing over all of the channels. Depending on the angle, the result may be as indicated in FIG. 9 or 10 and provide a representation in echographic mode B or C on the basis of the delays shown in FIG. 14 which is in mode A.

The size of the target can be evaluated on the basis of the distance d beyond which the maximum amplitude is less than a threshold s.

The geometrical surface 40, capable of being represented by a polynomial, which corresponds best to the wavefront 42 may be sought by a conventional polynomial approximation method, and in general the least square method may be used.

The invention may be implemented by using an apparatus in which each measurement path or channel 20 associated with a transducer of order i has a structure as shown in FIG. 4. The path 20 comprises a sampler 22 which provides analog samples of the signal received by the transducer i, at the frequency of a clock 24, throughout the duration of time windows T set by a window timer 26. The samples are digitized by a converter 28 and they are stored in a memory 30 which is organized as a last-in, first-out LIFO.

The timer 26 is programmed to cause the returned wavefront to be transmitted at the end of a predetermined delay after the end of the echo. To apply the return signal to transducer i, the path 20 includes a digital/analog converter 32 followed by an amplifier 34. To compensate for absorption in the medium, the path 20 shown also includes an amplifier 38 followed by an attenuator 41 whose attenuation coefficient is modified as a function of time by a programmer 43 that contains the inversed function of the negative exponential of absorption in the medium.

The apparatus further includes computation means 36 for read and write access to the memory 30 and making it possible to determine the time location of the maximum of each stored signal. The computation means contain a program for determining that surface which has the best possible match with the time distribution of the maxima obtained by reading out the memories 30, and optionally modifying the values and time positions of the samples in each memory 30 so as to cause the last shot to correspond exactly to the geometrical approximation of the actual wavefront.

The electronic portion of the apparatus may differ from that shown in FIG. 4. In particular, it is possible to use an arrangement of the kind described in French patent No. 9113629 (U.S. patent application Ser. No. 07/971,166) in which each path comprises, in succession, a gain control logarithmic amplifier and an analog-digital converter which samples the signal and quantifies each sample. The digitized signal may be sent to a video bus for display. It is also applied to a unit for storage and for depth compensation, which assembly comprises a read/write memory and an adder-substractor enabling to add a stored digital sawtooth waveform to the signals. The path may also includes a sign detector placed at the input to the logarithmic amplifier.

Under such circumstances, the portion of the apparatus devoted to re-emission includes an exponentiation circuit (e.g. a read/write memory). The digital signals obtained have no sign because of the logarithmic conversion. A sign is attributed to them, e.g. by including a sign bit in the memory. This bit is provided by the sign detector. The memory is read out with time reversal. The digital samples and sign read out from the memory are converted to analog form by a digital analog converter, and they are applied to a linear amplifier that feeds the transducer from which each signal originates.

As mentioned above, the transducers may be distributed in a very wide range of types of matrix.

By way of example, FIG. 5 shows a matrix comprising 121 transducers, numbered 0 through 120.

Figure 6:
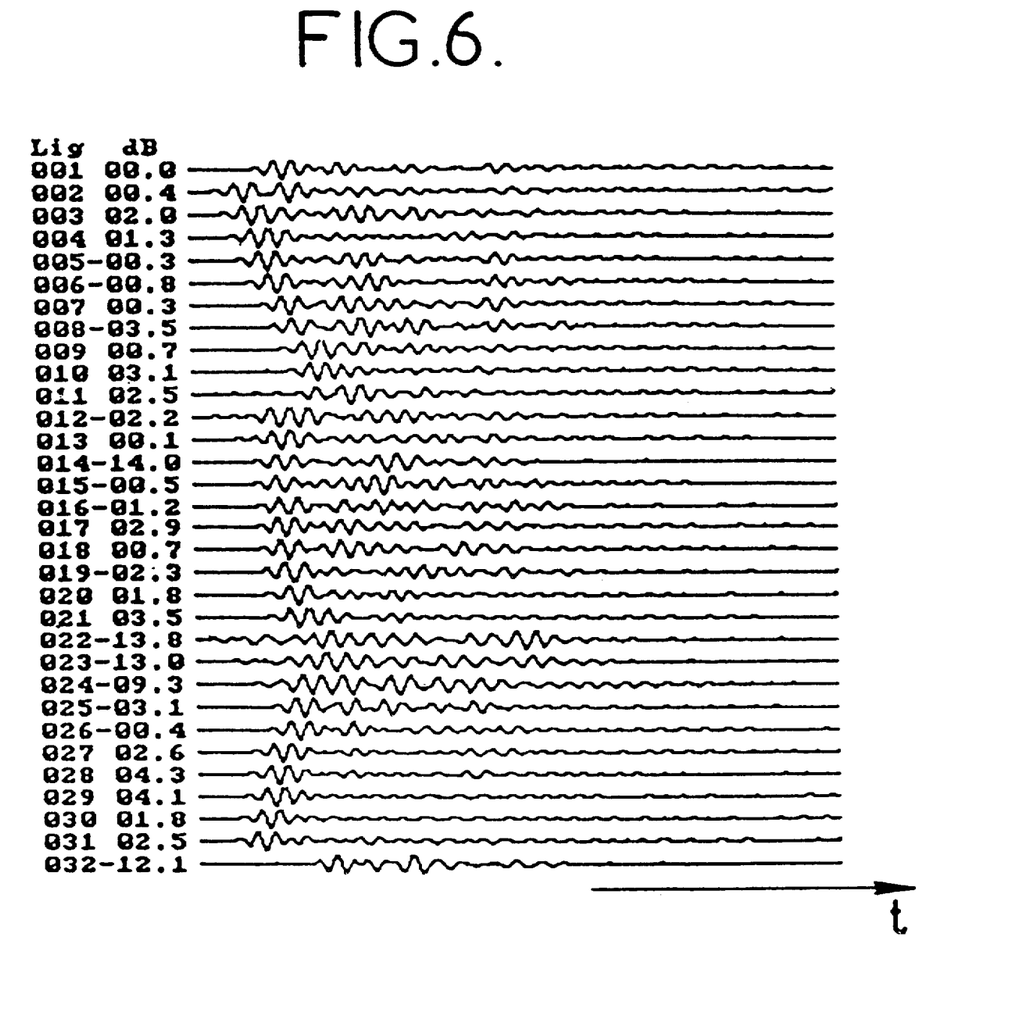
FIG. 6 is a waveform diagram showing echo signals provided by thirty-two of the transducers in an array as shown in FIG. 5, in response to a first reflection on an extended single target (e.g. a bile stone) situated in the medium under investigation, in response to a single pulse emitted by the central transducer.
Figure 7:
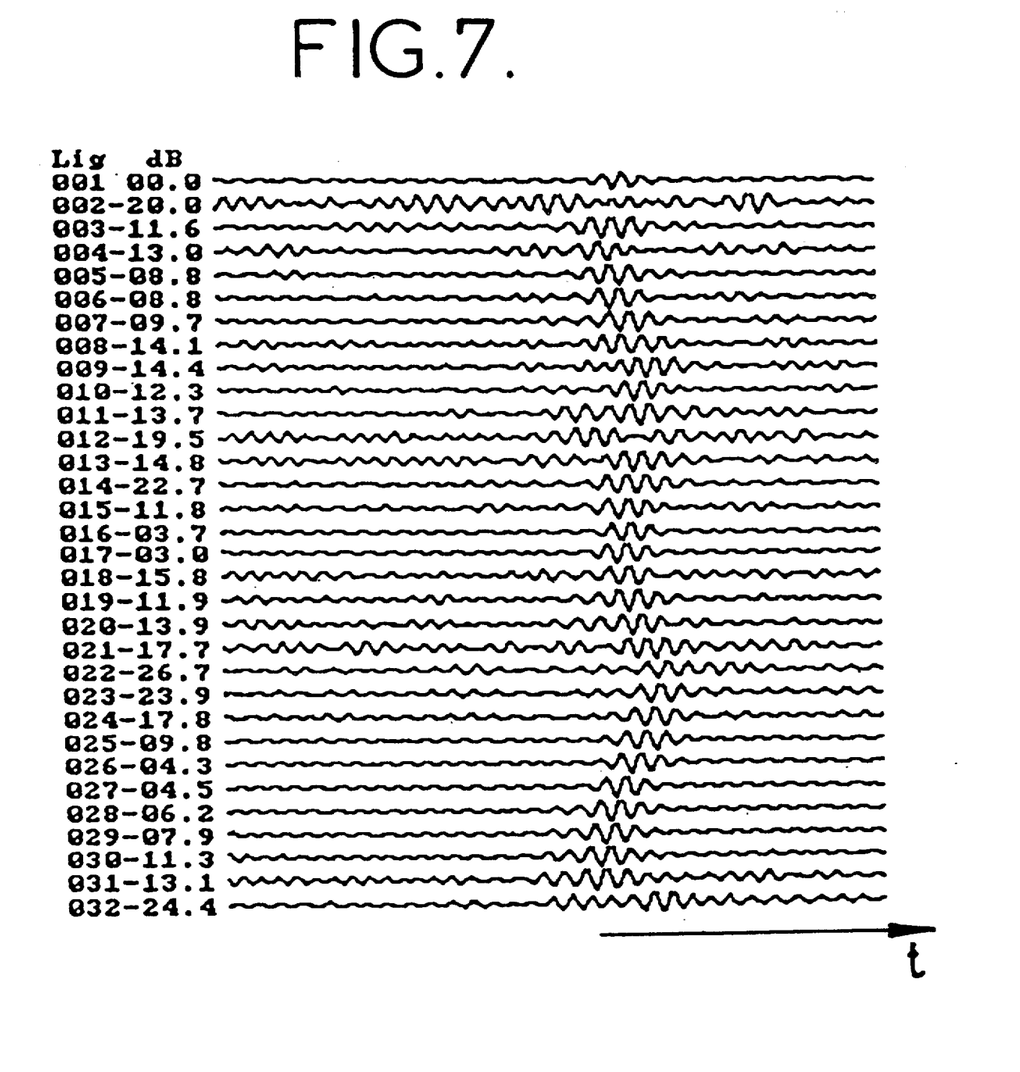
FIG. 7 is a waveform diagram showing the signals received by the same thirty-two transducers taken from the matrix distribution of FIG. 5, after the first time reversal.

FIGS. 6 and 7 show some of the signals that appear in an apparatus implementing the method of the invention using a matrix of 121 transducers in association with a medium that contains a single target that is highly reflective. FIG. 6 shows variation of the echo signals from the thirty-two transducers with time in response to illumination by the central transducer only, i.e. the signals obtained during step (b) as defined above (with transducer No. 1 being furthest from the axis). It can be seen that the signals are highly assymetrical and do not enable to locate accurately the maximum value corresponding to the wavefront.

In contrast, the echo signals received after the first time reversal (step (c)), as shown in FIG. 7, clearly show firstly that they have become more symmetrical and secondly that a clear maximum is present, thus already making a good approximation possible.

The concentration of the beam on the target continues further during possible following iterations, with the echo signal being symmetrical on each odd numbered iteration.

Figure 8:
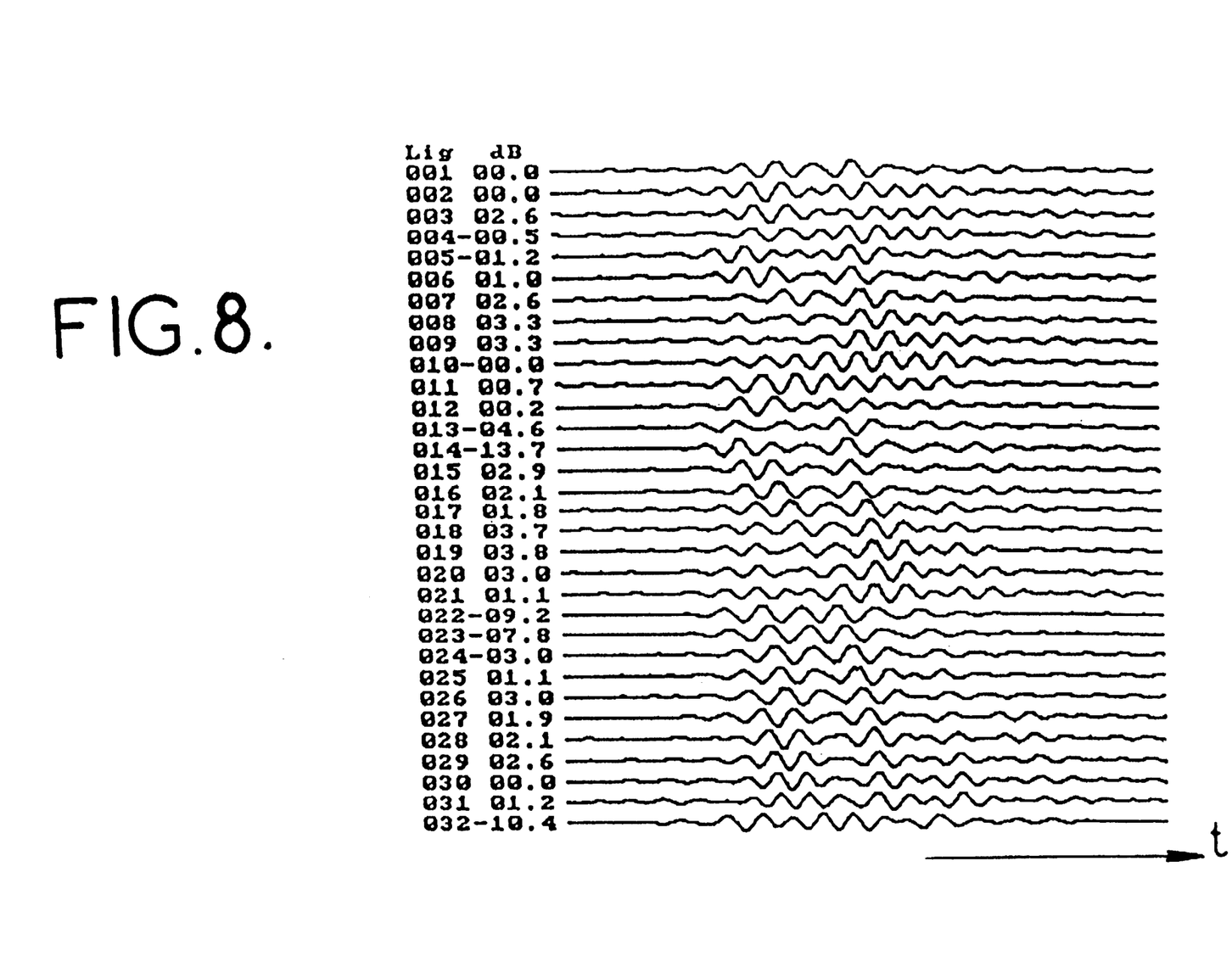
FIGS. 8 and 9 are similar to FIGS. 6 and 7 and show the signals obtained in a medium containing three ball-shaped targets of different sizes.

Since the target as shown is not centered relative to the transducer matrix, the maxima are in alignment on a line that is oblique on the signal record. FIGS. 8 and 9 are similar to FIGS. 6 and 7 but they correspond to three targets distributed in the medium. FIG. 10 is obtained after five time reversals.

Figure 11:
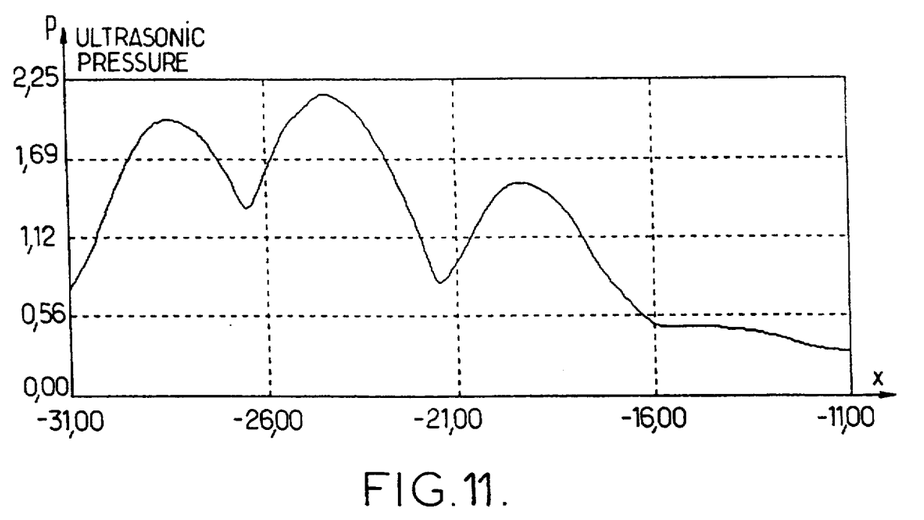
FIGS. 11 and 12 show the pressure field measured in the plane containing the three targets and obtained by emitting the time reversals of the signals shown in FIGS. 8 and 10, respectively after a first reversal and after five reversals (and, in the five-reversal case, with the transducers being activated in compliance with a "spherical" relationship) for an apparatus in which the transducers are distributed in the array of FIG. 5.
Figure 12:
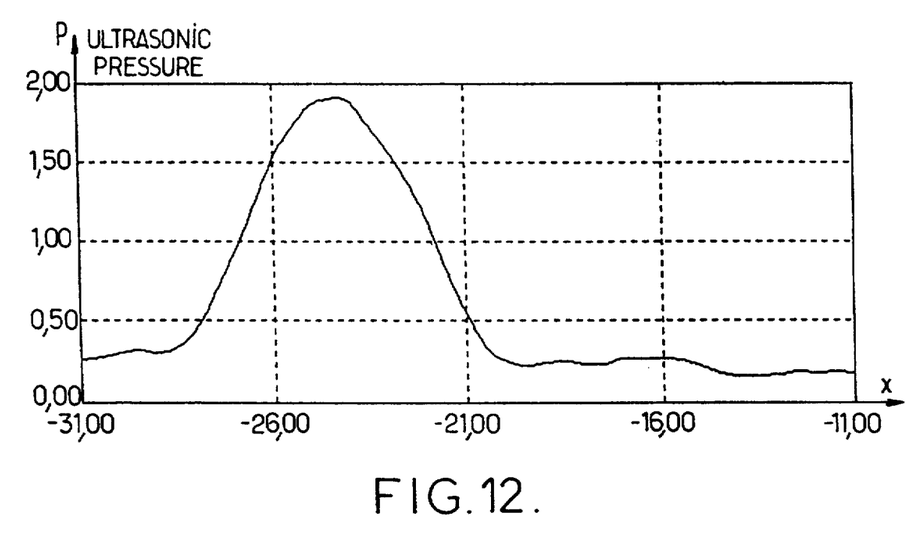

FIGS. 11 and 12 show the acoustic pressure as measured in the plane of the targets along the ordinate axis. The targets have the same distribution as in FIGS. 8, 9 and 10 and there were three of them.

FIG. 11 shows the acoustic pressure distribution obtained after the first time reversal: The three maxima corresponding to the three targets are already clearly visible. This localization disappears after the second time reversal.

From one odd numbered iteration to the next, the effect of focussing on the largest target becomes greater, and after the fifth time reversal, approximation to the wavefront by a sphere and reemission using a delay relationship that corresponds to the center of the sphere, an acoustic pressure distribution as shown in FIG. 12 is obtained.

Figure 13:
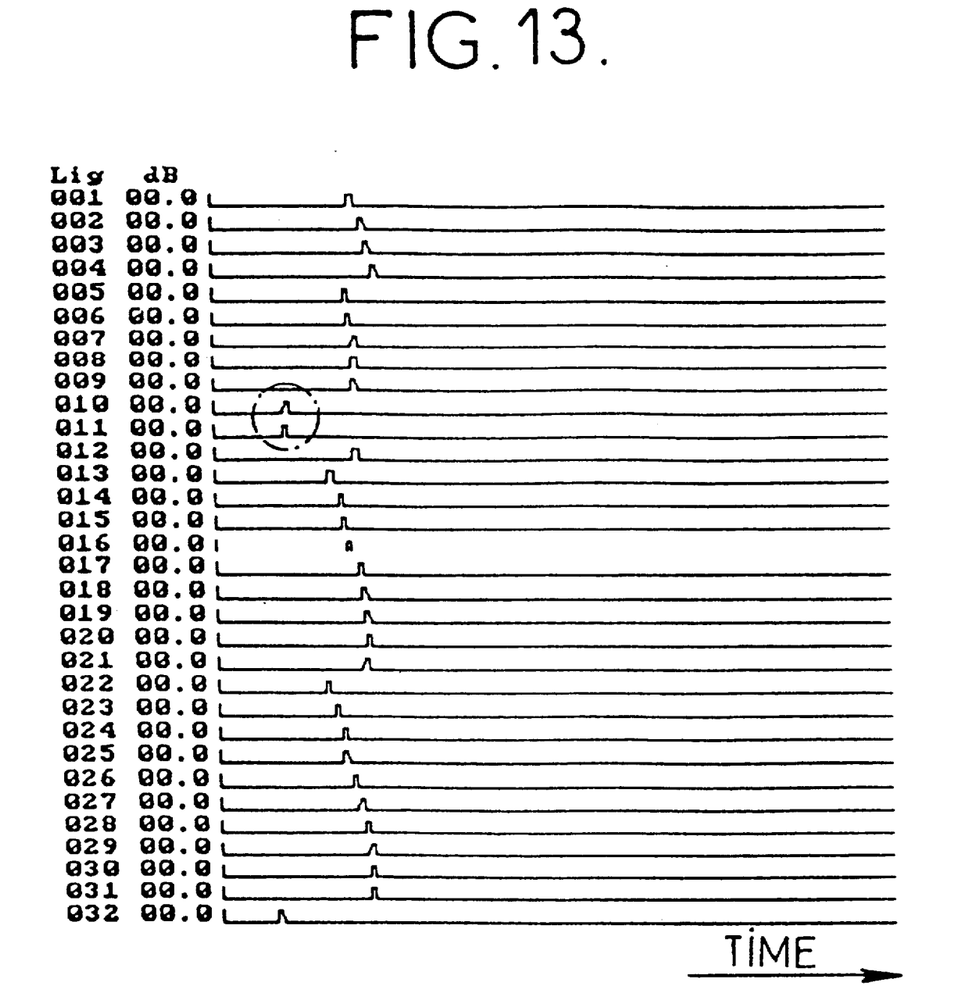
FIG. 13 shows the time distribution of maxima on the various paths of FIG. 10 for the same medium that give rise to the signals shown in FIGS. 8 to 10.
Figure 14:
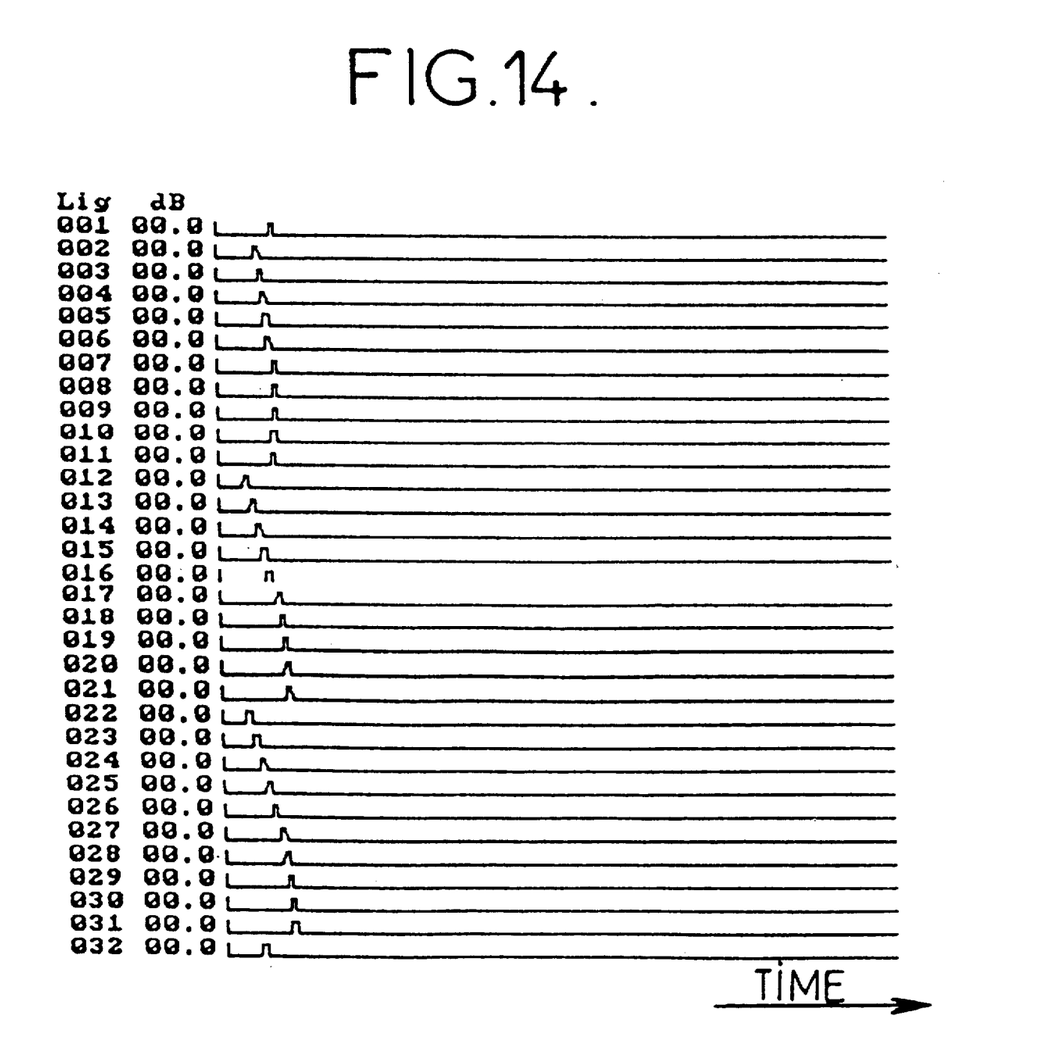
FIG. 14 shows the time distribution of the signals that are emitted for reconstituting a spherical wave surface that constitutes the closest approximation to the distribution of FIG. 13.

FIGS. 13 and 14 show, by way of example, the results obtained using an array of 121 transducers and a medium under observation identical to that which gave rise to the signals in FIGS. 8 to 10. Searching for maxima in the signals of FIG. 10, e.g. by determining the addresses of the samples having the greatest values, gives rise to the distribution shown in FIG. 13 in which some aberrant points can be seen such as those enclosed in a chain-dotted ring. Ignoring the aberrant points, the wavefront represented by the samples of FIG. 13 can be used for characterizing the coordinates of the target. Then, using a theoretical model of the coordinates, it is possible to synthesize a wavefront by emitting pulses having the relative dispositions shown in FIG. 14, which pulses correspond to a spherical approximation.

As mentioned above, it is possible to seek the time window to be used by summing the signal envelopes received on each of the paths over the entire duration of the received signals. That is equal to an incoherent sum, and permits to verify that the resulting signal does indeed present a local maximum in the selected window.

Figure 15:
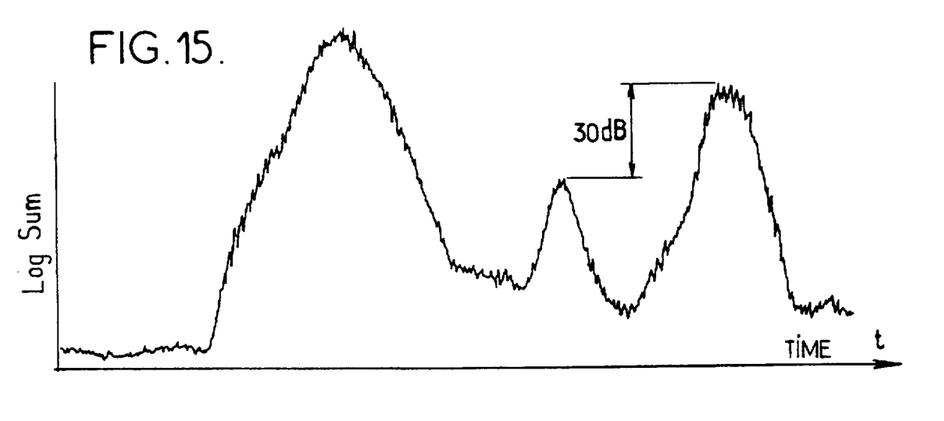
FIGS. 15 and 16 show how the incoherent sum (FIG. 15) and the coherent sum (FIG. 16) of the signals received from the various paths vary over time t for echo signals that come from a solid medium having two sharp interfaces and defect of limited volume, on return of transmitted signals of the type shown in FIG. 3.

FIG. 15 shows the shape of variation of the sum S of the signals received on the different paths after one time reversal for an array and a medium under investigation constituted by a solid block having a three-dimensional defect.

Figure 16:
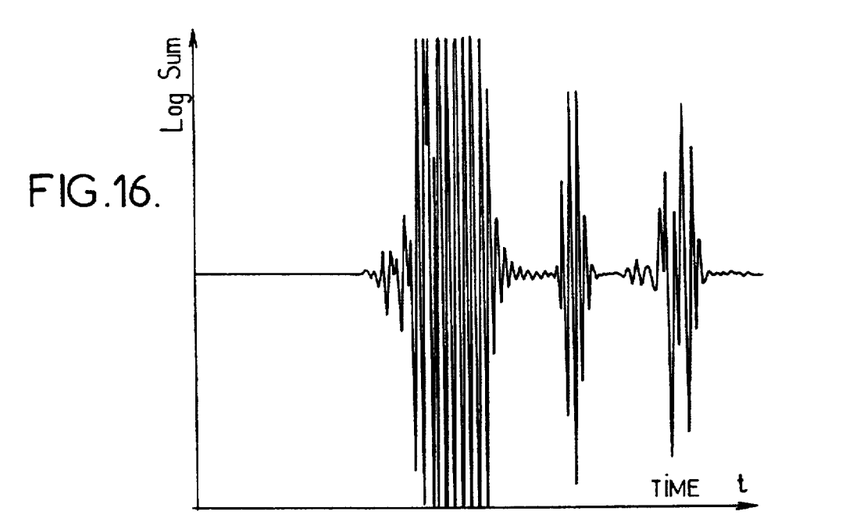

It is also possible to sum the signals coherently, i.e. to sum them after time shifting, in which case a distribution of the kind shown in FIG. 16 is obtained showing even more clearly the presence of targets.

Figure 17:
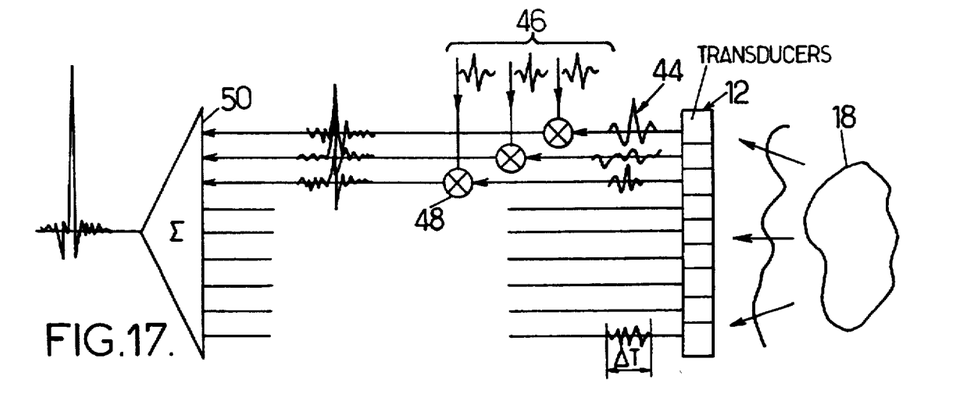
FIG. 17 shows how the signals received after a time-reversed emission can be subjected to convolution by multiplying them with the returned emission signals and then summing the results.

Finally, when it is necessary to obtain optimum reception focussing of signals returned by a non-uniform medium, a mere time shift of the echographic signals can be replaced with a convolution operation between the echographic signals 44 and signals 46 constituting time reversals of the emission signals (FIG. 17). The convolution products obtained in respective convolution circuits 48 are summed together in a summing circuit 50. Under such circumstances, it is common practice to use digital systems and the time window $\Delta T$ used may be adapted to each path in order to optimize it.

I claim:

1. Method for acoustically inspecting a medium and localizing a reflective target in said medium, comprising the steps of:

(a) illuminating at least a zone of a medium where a target is to be detected, from at least one transducer;

(b) detecting echo signals which present echoes originating from said medium, each of said echo signals being delivered by one of a plurality of electro-acoustic transducers distributed at nodal points of a geometrical array;

(c) selecting one of said echo signals which occur during a predetermined time window and which originate from a particular zone of said medium to obtain selected echo signals and individually storing said selected echo signals in digital form;

(d) time reversing the distribution and shape of the selected echo signals to obtain time reversed echo signals and retransmitting the time reversed echo signals from said plurality of electro-acoustic transducers as further echo signals;

(e) storing the further echo signals resulting from step (d) and repeating time reversal and retransmission;

(f) after (2n+1) time reversals, n being a positive integer and/or zero, determining times of occurrence of maxima of said further echo signals; and (g) forming a last wave front by applying electrical signals all having the same shape and all of short duration to said plurality of said electro-acoustic transducers, at instants defined, for each of said plurality of electro-acoustic transducers, by the difference between a selected predetermined instant and the time of occurrence of the respective maximum.

2. Method for acoustically inspecting a medium and localizing a reflective target in said medium, comprising the steps of:

(a) illuminating at least a zone of a medium where a target is to be detected, from at least one transducer;

(b) detecting echo signals which present echoes originating from said medium, each of said echo signals being delivered by one of a plurality of electro-acoustic transducers distributed at nodal points of a geometrical array;

(c) selecting those of said echo signals which occur during a predetermined time window and which originate from a particular zone of said medium to obtain selected echo signals and individually storing said selected echo signals in digital form;

(d) time reversing the distribution and shape of the selected echo signals to obtain time reversed echo signals and re-transmitting the time reversed echo signals from said plurality of electro-acoustic transducers as further echo signals;

(e) storing the further echo signals resulting from step (d) and repeating time reversal and retransmission; and (f) computing characteristics of a geometrically definable surface closest to maxima of all said further echo signals after 2n+1 time reversals, n being a positive integer, said surface representing a wave front of said further echo signals.

3. Method according to claim 2, further comprising:

(g) forming a last wavefront by applying electrical signals all having the same shape and all of short duration to a plurality of said electro-acoustic transducers, at instants defined, for each of said electro-acoustic transducers, by the difference between a selected predetermined instant and a time corresponding to said geometrically definable surface for said respective transducer.

4. Method according to claim 2, for inspecting said medium having an interface, wherein the echo signals during step (c) and the further echo signals during step (e) are only stored during each time window which is selected to discard echoes on said interface.

5. Method according to claim 2, further comprising a step of determining said time window by (a1) incoherently summing said echo signals from said illumination and (a2) selecting said time window for including the maxima of all said echo signals.

6. Method according to claim 2, further comprising arbitrarily selecting said time window from information available on the location of possible targets in the medium.

7. Method according to claim 2, wherein step (f) comprises determining the characteristics of a spherical surface closest to said maxima.

8. Method according to claim 7, wherein said spherical surface closet to said maximum is determined as being the surface for which the sum of square values of deviations each of said deviations being between one point of the spherical surface and a respective point of a respective maximum in minimum.

9. Method according to claim 2, wherein step (f) comprises determining coefficients of a polynomial equation of said surface.

10. Method according to claim 9, further comprising the step of determining the variance of deviations between said surface and the positions of the maxima and comparing said variance with a predetermined value.

11. Method according to claim 8, further comprising concentrating sound energy by applying electrical signals to at least said electro-acoustic transducers at times which are distributed for causing focusing at a center of said spherical surface, after said signals have been amplified.

12. Method according to claim 2, comprising a step of determining whether one reflective said target is present in said medium by comparing echo signals received during steps (b) and (c), said at least one transducer of step (a) belonging to said plurality of electro-acoustic transducers.

13. Method according to claim 12, wherein said comparing echo signals received during steps (b) and (c) is made by computing cross-correlation coefficients of the echo signals and comparing said cross-correlation coefficients to a predetermined threshold.

14. Method according to claim 2, further comprising the step of computing a convolution product of the echo signals and of the respective time reversed transmitted signals giving rise to said echo signals.

15. Method according to claim 2, comprising, during step (c), submitting said those of said echo signals in analog form by said plurality of electro-acoustic transducers to a logarithmic amplification; storing the amplified echo signals as digital samples and a bit indicating a sign; adding a digital depth compensation digital ramp to said digital samples; during step (d), attributing the respective stored sign to the depth compensated samples; digitally exponentiating said depth compensated samples; converting said digital samples to analog-form; and applying the converted samples to the respective said electro-acoustic transducers.

16. Method according to claim 7, wherein said spherical surface closest to said maxima is determined as being the surface for which the sum of square values of deviations from each point of an actual wave front passing through said maximum is minimum.

17. Device for acoustically examining a medium and locating reflective targets in said medium, comprising:
a plurality of emitter-receiver transducers constituting a transducer array; and
circuit means connected to said transducers and arranged for, successively, after a first transmission of acoustic energy toward the medium, repeating an odd number of times a sequence including:
receiving echo signals through said transducers, storing said signals, and re-emitting the stored signals after time reversal, and
computation means connected to receive the echo signals stored by said circuit means and arranged for computing characteristics of a geometrically definable surface best matching maxima of the echo signals and representing a wave front.

18. Device according to claim 17, wherein:
said circuit means comprises, for each of said transducers in the array, a processing channel having a sampler, an analog-digital converter, a LIFO memory for storing digitized samples from said analog-digital converter, a digital-analog converter and means for amplification and depth compensation, and said computation means are connected and arranged for read and write access to each said LIFO memory in respective ones of said processing channels and to modify the values and the time distributions of the digitized samples so that the digitized samples correspond to said geometrically definable surface.

* * * * *